United States Patent [19]

Ganci et al.

[11] Patent Number: 5,281,269
[45] Date of Patent: Jan. 25, 1994

[54] AQUEOUS PROCESS FOR PREPARATION OF MODIFIED BETA QUINACRIDONE

[75] Inventors: James B. Ganci, Wilmington; Shivakumar B. Hendi, Newark; Walter C. Zukowski, Wilmington, all of Del.

[73] Assignee: Ciba-Geigy Corporation, Ardsley, N.Y.

[21] Appl. No.: 944,591

[22] Filed: Sep. 14, 1992

Related U.S. Application Data

[63] Continuation-in-part of Ser. No. 711,787, Jun. 7, 1991, abandoned.

[51] Int. Cl.$^5$ .............................................. C09B 48/00
[52] U.S. Cl. .................................... 106/497; 106/400; 106/401; 546/49; 546/56; 546/57
[58] Field of Search ................... 106/497, 400, 401; 546/49, 56, 57

[56] References Cited

U.S. PATENT DOCUMENTS

| | | | |
|---|---|---|---|
| 2,844,484 | 7/1958 | Reidinger et al. | 546/49 |
| 2,844,485 | 7/1958 | Struve | 546/49 |
| 2,844,581 | 7/1958 | Manger et al. | 546/49 |
| 2,969,366 | 1/1961 | Griswold et al. | 546/46 |
| 4,298,398 | 11/1981 | Fitzgerald | 106/497 |
| 4,439,240 | 3/1984 | Ganci | 106/495 |
| 4,541,872 | 9/1985 | Jaffe | 106/495 |
| 4,760,144 | 7/1988 | Jaffe | 546/49 |
| 4,857,646 | 8/1989 | Jaffe | 106/497 |

Primary Examiner—Mark L. Bell
Assistant Examiner—Scott L. Hertzog
Attorney, Agent, or Firm—Marla J. Mathias; George R. Dohmann

[57] ABSTRACT

Aqueous processes for the preparation of a new beta quinacridone modification possessing a magenta color having C.I.E. color space values in masstone of $L=33-36$, $A=34-40$ and $B=8-15$ starting with the crude pigment and comprising several milling and alternative deaggregation and recrystallization steps, the latter being facilitated at elevated temperatures aided by the presence of base and minor amounts of crystal growth auxiliaries, and the beta quinacridone modification having the indicated C.I.E. color space values.

30 Claims, 1 Drawing Sheet

AQUEOUS PROCESS FOR PREPARATION OF MODIFIED BETA QUINACRIDONE

This application is a continuation in part of Ser. No. 711,787, filed Jun. 7, 1991, now abandoned.

SUMMARY OF THE INVENTION

The present invention involves the conversion of a crude beta quinacridone pigment to a preferred new modification in the presence of major amounts of water, aqueous base and minor amounts of organic liquid and/or surface active agents capable of growing and improving the crystallinity of the product. Additionally, treatment at elevated temperatures facilitates the transformation to the desired color range.

The modified beta quinacridone pigment can be prepared by a series of aqueous-based procedures including aqueous milling of crude beta quinacridone with various amounts of water, caustic, and alcohol capable of forming a second phase, such as n-pentanol, and a phase transfer catalyst, followed by a thermal development step. Alternatively, the crude pigment can be premilled providing typically highly aggregated, non-crystalline pigment precursors which are then subjected to a deaggregation/recrystallization step by aqueous milling as previously described followed by thermal development. Alternatively, the premilled pigment can simply be stirred and heated with the aforementioned adjuvants leading to the desired product in a single step.

BACKGROUND OF THE INVENTION

Quinacridone, also referred to as 5,12-dihydroquino[2,3-b]acridine-7,14-dione, of the following formula

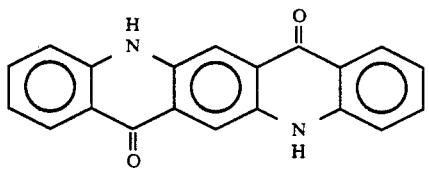

is known to exist in three polymorphic modifications. The alpha (U.S. Pat. No. 2,844,484) and gamma (U.S. Pat. Nos. 2,844,581 and 2,969,366) forms are bluish-red pigments, while the beta form (U.S. Pat. No. 2,844,485) is a violet pigment.

A second, distinct beta quinacridone polytype designated $\beta_I$ was identified and described in U.S. Pat. No. 4,857,646. The new form differs from the known beta form by a modified X-ray diffraction pattern and a significant color shift from violet to magenta. The new form also offers a variety of new color styling opportunities, particularly for automotive and industrial finishes. The pigment additionally shows excellent hiding power, purity of shade, fastness to light and weathering, resistance to high temperatures and solvent and softener resistance.

Several methods were identified for preparing the new pigment and for preparing it in the desired relatively low specific surface area form. The new pigment could be prepared either by controlled particle size reduction/ripening of a crude pigment or by overmilling of a crude and then growing the pigment particles to the desired size and surface area. It was also noted that both particle size reduction and growth by crystallization could be achieved in a single operation.

Applicable disclosed procedures can be summarized as follows:

(1) Milling of alpha quinacridone, preferably of small particle size, in the presence of alcohol and base.

(2) Milling of crude or large particle size $\beta_{II}$ quinacridone (surface area of 3-8 m$^2$/g) in the presence of alcohol and base and appropriate milling media.

(3) Conducting the second procedure in two steps with premilling of the crude beta quinacridone following by ripening or particle size growth in a subsequent alcohol-base milling step.

(4) Particle ripening of a finished, particle size reduced beta quinacridone (a) by milling in the presence of alcohol and base, or (b) refluxing in basified alcohol.

Further experimentation with the new beta polytype revealed that it could exhibit a greater breadth of color within the magenta class. Thus, in terms of C.I.E. coordinates with L, A, B color space units, the modified form disclosed in U.S. Pat. No. 4,857,646 exhibited masstone L (lightness)=35.2 units, A (chroma)=38.0 units, B (hue)=10.9 units when incorporated into a high solids enamel paint system. It has now been determined that each of the L, A, B coordinates can be defined in terms of a range of values.

DESCRIPTION OF THE INVENTION

Accordingly, the instant invention relates to new aqueous processes for preparing the modified beta quinacridone which upon incorporation in a paint, such as a commercial high solids enamel, manifests the indicated range of numerical values based on C.I.E. coordinates, showing high saturation or brightness and opacity with optimum pigmentary properties, and to the modified beta quinacridone with the defined range of color space values. The aqueous processing also provides various peripheral benefits including substantially reduced safety and environmental concerns as well as reduced cost of manufacture.

The new pigment can be made by the following routes starting from crude beta quinacridone.

I. Dry particle size reduction and wet development such as:

A. Premilling crude beta quinacridone by conventional means using appropriate grinding media followed by aqueous milling using major amounts of water and minor amounts of base, phase transfer catalyst, and an alcohol capable of forming a separate phase and facilitating particle growth and a thermal development step affecting the desired transformation, followed, if required, by dilute acid extraction to remove any abraded grinding media.

B. Premilling crude beta quinacridone and then stirring and refluxing in large amounts of water containing aqueous base, a phase transfer catalyst and an alcohol capable of forming a separate phase, followed by acid extraction, if required.

II. Wet particle size reduction and development simultaneously via aqueous milling using appropriate grinding media and the ingredients described above followed by a thermal development step.

Premilling refers to milling in the complete absence of liquids, or if liquids are present, such as a phase directing solvent or a surface active agent, they are present in small amounts such that the pigment retains powder characteristics. The initial step of premilling of the crude $\beta$-quinacridone can be carried out neat or in the presence of 10 to 30%, by weight, of an inorganic salt such as NaCl, CaCl$_2$, Na$_2$SO$_4$ or Al$_2$(SO$_4$)$_3$, with or without water of hydration. The preferred milling composition comprises, by weight, 75 to 85% crude and 15 to 25% anhydrous Na$_2$SO$_4$. The salt functions primarily as a suppressant of potential explosivity of the resulting millpowder. The premilling can be conducted with known grinding apparatuses such as a ball mill or an attritor mill. A variety of milling media can be used such as metal or porcelain balls, preferably ceramic beads or stainless steel balls, nails or shot. The premilling is continued until a desired activation level is achieved. The premilling can be controlled by assessing the width at half height of the 5.9°2Θ double glancing angle band. The greater the width, the smaller the particle size of the premilled pigment powder. Thus, the preferred particle size reduction leading to sufficient activation of the premilled powder increases the width of the band at half height from 0.23°–0.26° to a minimum of 0.3°. The premilled pigment salt mixture is separated from the grinding media, with removal of any metal that wears off during the milling operation.

General techniques for aqueous milling are known and have been described, for example, in U.S. Pat. Nos. 4,439,240 and 4,541,872. Aqueous milling requirements place additional restraints on the pigment/aqueous base and auxiliaries in that the millbase must be fluid enough to permit the desired deaggregation and recrystallization processes to occur via the milling media.

The two-step process designated procedure (IA), involves premilling of crude beta quinacridone such that particle size is reduced to highly aggregated subpigmentary size followed by ripening or particle size growth in a subsequent aqueous milling step. Finally, a thermal development step is required to achieve the ultimate product goal. As noted, the premilling can be carried out with a variety of milling media, such as steel balls and nails, steel shot, or ceramic balls, generally in a temperature range of from 20°–40° C. for a period of 24–72 hours. If premilling is carried out with steel milling media, it is desirable to distill off the alcohol and extract the resulting aqueous pigment slurry with dilute mineral acid to remove any metal that wears off from the media during the milling operation. If acid extraction is to be avoided, as well as the usual slight color blue shift in masstone and tint caused by acid extraction, ceramic milling media are suggested.

Procedure (II) allows for the preparation of a similar product from crude by a direct one-step process involving aqueous milling of the crude in the presence of the indicated ingredients with appropriate milling media to effect particle size reduction as well as crystal ripening. This dynamic particle size reduction/ripening system causes form conversion and reaches an equilibrium particle size which yields the product of this invention upon subsequent thermal development. By virtue of the two functions in the milling operation, and in order to maximize pigment tinctorial quality, it is preferred to maintain a relatively high liquid to pigment weight ratio of about 10:1. Milling in this procedure generally proceeds in a temperature range from 20° to 40° C. for a period of 24 to 72 hours.

Surprisingly, the presence of oxygen, such as in air, is normally required in the thermal development step to achieve the desired pigment quality in a reasonable time period. Moreover, performing the thermal development step in ambient air rather than under inert gas flow has the obvious advantage of reduced operation cost.

Alternatively, in procedure (IB), the same starting premilled pigment can be simply refluxed in water together with the indicated ingredients to produce a similar product.

The aqueous milling and refluxing operations are conducted in the presence of major amounts of water and minor amounts of a base, an alcohol, capable of forming a second phase and a phase transfer catalyst to provide appropriate particle change and growth.

Applicable alcohols include C$_4$-C$_8$ alkanols and cycloalkanols (preferably C$_5$-C$_7$ ring compounds) including pentanol, hexanol and cyclohexanol. The alcohol must be stable in the presence of base. Pentanol is preferred for purposes of this invention.

Applicable inorganic and organic bases include alkali metal hydroxides such as potassium hydroxide, sodium hydroxide, and lithium hydroxide, and quaternary ammonium hydroxides such as benzyltrimethylammonium hydroxide. Sodium and potassium hydroxide are preferred.

Particularly useful phase transfer catalysts are quaternary ammonium salts including benzyl tributylammonium chloride, cetyl trimethylammonium chloride, tetrabutylammonium chloride, with benzyl tributyl ammonium chloride being preferred.

In the aqueous milling procedures, the concentrations of the various ingredients are selected to optimize pigmentary properties. Accordingly, for every 100 parts, by weight, of crude quinacridone pigment starting material, amounts of water range from 600 to 1400 parts, and preferably 700 to 1000 parts; alcohol ranges from 6 to 15 parts, and preferably 8 to 12 parts; base ranges from 50 to 120 parts, and preferably 60 to 80 parts; and catalyst ranges from 2 to 6 parts, and preferably from 2 to 4 parts; all parts being by weight.

The thermal development step is utilized subsequent to aqueous milling to facilitate transformation to the desired color range and involves subjecting the ground pigment slurry to temperatures of from 50° to 100° C., preferably from 70° to 97° C., for a period of from 2 to 8 hours.

In the stirring/refluxing procedure IB, the concentrations of the ingredients range, for every 100 parts by weight, of premilled beta quinacridone, from 500 to 800 parts of water, and preferably 550–700 parts; from 12 to 25 parts of alcohol, and preferably from 14–18 parts; from 15 to 40 parts of base, and preferably 21 to 25 parts; and from 2.5 to 5.0 parts of catalyst, and preferably 3 to 4.5 parts; with the ripening occurring at temperatures of from about 70°–97° C. for periods ranging from 1 to 8 hours.

The pigment is best isolated after alcohol removal by distillation. The alcohol is thus recovered and the pigment isolated from the slurry by filtration. After isolation, the pigment is washed free of base with water.

The resulting pigment has a magenta color, showing a pronounced color shift vs. known beta quinacridone pigments. In particular, the desirable characteristics of the new beta modification are masstone opacity, brightness and yellowness when compared to currently available commercial beta quinacridones.

The methods of the present invention afford the opportunity to produce this modification in even larger particle size and brighter masstone color than the product disclosed in U.S. Pat. No. 4,857,646. Bluer products can also be obtained by "underdevelopment" using the techniques illustrated in the examples presented hereinbelow and/or by admixture with commercially available violet quinacridones.

The new beta modification is defined in terms of C.I.E. L,A,B color space values using a D65 illuminant and a 10 degree observer with specular component. The following values are obtained utilizing known masstone measurement (as noted hereinafter) from sprayed paint panels of pigment masstones. The color measurements are obtained using a Hunter Lab Colorquest Spectrocolorimeter (Hunter Associates Laboratory, Inc., Reston, Va. 22090).

|  | Color Space | | |
|---|---|---|---|
|  | Broad Range | Preferred Range | Most Preferred Range |
| Lightness (L) | 33–36 | 34–36 | 35–36 |
| Chroma (A) | 34–40 | 36–38 | 36–38 |
| Hue (B) | 08–15 | 09–12 | 9–11 |

BRIEF DESCRIPTION OF THE DRAWING

The masstone color spaces values are depicted in the diagram designated FIG. 1. The "+A" and "+B" designations in the x and y axes are indicative of redder and yellower shades, respectively, while the "−A" and "−B" designations in the x and y axes are indicative of greener and bluer shades, respectively. The L value is represented by the z axis and thus is not depicted in the diagram. The box CS reflects the coordinates for the modified beta quinacridones of the invention, while dot CS' represents the L=35.2, A=38, B=10.9 coordinates of the modified beta quinacridone disclosed in U.S. Pat. No. 4,857,646. The ranges of color space values reflect the broader color variability of the instant pigments and the capability of the described processes in being able to prepare such materials.

While the indicated masstone values may be obtained by known techniques, the general procedure relied upon herein is based on a 0.15 pigment to binder ratio, wherein the pigments are dispersed using 37.5 grams pigment, 1.2 grams quinacridone antiflocculating agent, 2.5 grams polymeric dispersant, 85.4 grams acrylic resin solution and 38.3 grams of xylene. The ingredients are charged to a 500 ml glass jar along with 980 grams of 4 mm diameter diagonal steel rods and rolled for 64 hours (25% pigment loading, 61.2% nonvolatiles and a pigment to binder ratio of 0.69). The final masstone panels are derived by combining 41.3 parts of the previously described millbase, 33.7 parts acrylic resin solution, 28.9 parts melamine crosslinking resin and 21.2 parts of a film fortifying solution (38.3% solids including UV absorber, antioxidant and catalyst). The mixture is diluted with "Solvesso 100" solvent to a spray viscosity of 28 seconds (Ford cup #4). It is then sprayed onto a primed aluminum panel, exposed to ambient air for 10 minutes and then stoved for 30 minutes at 130° C.

Figure 1:
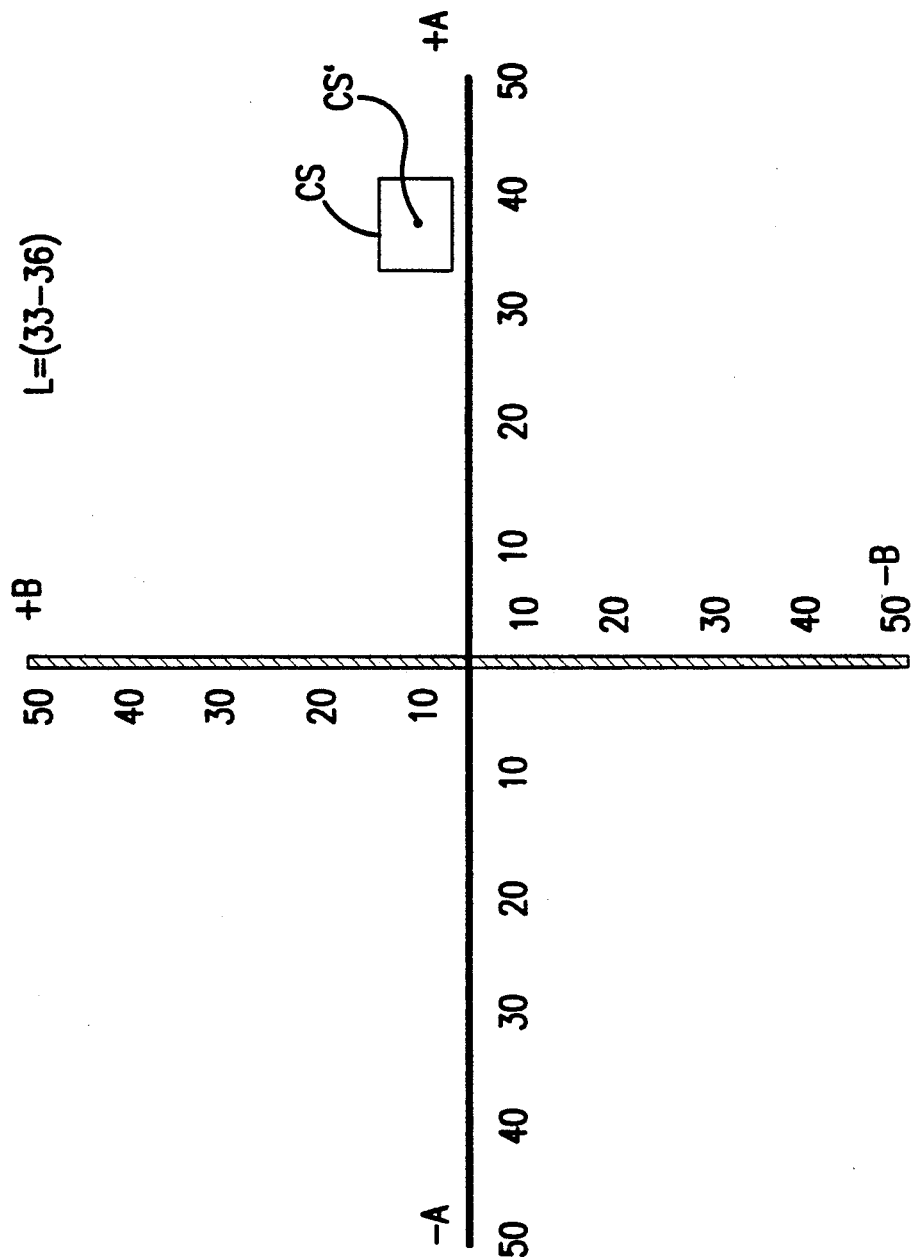

Like many other pigments, the product is advantageously surface treated by known methods to improve its performance in a variety of automotive and other finish systems. Additives which serve to lessen or avoid flocculation and increase pigment dispersion stability can be advantageously used with this pigment. When so treated, the pigment shows outstanding performance on its own but particularly as a blending agent for styling of solid reds in a variety of systems but particularly in automotive finishes, such as acrylics, alkyds, polyester and other systems, including waterborne systems. 2-Phthalimidomethylquinacridone, quinacridonesulfonic acids, and/or its metal salts, N-(dialkylaminoalkyl)quinacridone-sulfonamide or other similar derivatives can serve as additive antiflocculating agents. In some systems, the addition of polymer dispersants further improves the performance of this pigment.

Pigmented systems which contain the pigment as a component of mixtures of substances, possibly in addition to other components, include: pastes, flush pastes, preparations, printing colors, distempers, binder colors or lacquers and varnishes of all kinds, such as physically and oxidatively drying lacquers and varnishes, acid, amine and peroxide curing varnishes or polyurethane varnishes. The pigment may also be present in synthetic, semisynthetic or natural macromolecular substances, such as thermoplastic resins, e.g., polyvinyl chloride, polystyrene, polyethylene, polyesters, phenoplasts, aminoplasts and rubber. The pigment may also be present in admixture with natural, regenerated or synthetic fibers, such as glass, silicate, asbestos, wood cellulose, acetylcellulose, polyacrylonitrile, polyester, polyurethane and polyvinyl chloride fibers or mixtures of the same, and also in powders, for example, fillers, organic or inorganic pigments. With the new pigment, there are obtained prints, paint and varnish coatings, coverings, shaped articles, such as sheets, threads, plates, fibers, blocks, granulates and rods with a brilliant red color of excellent durability.

The mixtures of substances which contain as active coloring ingredient the magenta pigment of good hiding power, may be of solid, elastic, pasty, viscous, mobile or thixotropic consistency. They may be obtained by conventional methods. Aqueous pastes may be obtained for example by stirring the pigment into water, possibly with the addition of a wetting or dispersing agent or by stirring or kneading the pigment into a dispersing agent in the presence of water and possibly of organic solvents or oils. These pastes may for example be used for the production of flush pastes, printing colors, distempers, plastic dispersions and spinning solutions. The pigment may also be introduced by stirring, rolling, kneading or grinding into water, organic solvents, nondrying oils, drying oils, lacquers, varnishes, plastics or rubber. Finally, it is also possible to work up the pigment by drying mixing with organic or inorganic masses, granulates, fibrous materials, powders and other pigments, to form mixtures of substances.

In addition to its excellent hiding power, outstanding purity of shade and good general fastness, such as fastness to light and weathering and solvent and migration resistance, the pigment is also characterized by superior resistance to high temperatures. For example, the thermal behavior of the pigment makes it possible to work it into high and low density polyethylene or polypropylene, without the shade of color being dulled by the effect of the temperatures used during work-up.

Notwithstanding that the key aspect of the instant invention is the preparation of the new beta quinacridone modification, it is to be noted that the invention is deemed to include pigment resulting from the above noted processes which comprise blends of the new beta quinacridone and minor amounts, i.e. less than about 50%, by weight, of conventional beta quinacridone. The blends exhibit the distinguishing characteristics and the pigmentary properties of the new beta quinacridone, although to a somewhat lesser degree.

The following examples further illustrate the embodiments of this invention. In these examples, all parts given are by weight unless otherwise indicated. Additionally, all Δ values are based on color values obtained relative to the alcohol milled product prepared according to U.S. Pat. No. 4,857,646.

EXAMPLE IA

A 1-SDG Attritor ™ mill manufactured by UNION Process, Inc. Akron, Ohio, is charged with 468 grams of beta quinacridone crude and 82.5 grams of anhydrous sodium sulfate. The mill is fitted with L-arms and charged with 3.78 liters of 0.6 cm diameter ceramic grinding media (64.2% $SiO_2$/26.7% MgO/5.8% $Al_2O_3$/1.2% $K_2O$/1.1% $Fe_2O_3$, 7.5 MOH hardness, 60–65 Rockwell 45N hardness, 3.0 kg-cm impact strength, 8500 kg/cm² compressive strength). The mill is rotated at 500 RPM. At the conclusion of the milling, the batch is recovered by opening the valve at the bottom of the mill while rotation is continued for 15 minutes.

EXAMPLE IB

Aqueous Milling

A 240 ml jar is charged with 600 grams of 0.3 cm steel shot, 95 ml water, 1.6 ml pentanol, 0.6 grams of 50% aqueous benzyltributylammonium chloride (BTBAC) solution, and 16 grams of 50% aqueous NaOH. 15 grams of the premilled beta quinacridone from Example IA are then added. The jar is sealed and rotated on a roller mill for 28 hours at 80 ft./min. linear speed. The jar is removed from the mill and placed in a laboratory oven set at 50°–55° C. for a period of six days.

The contents of the jar are then separated from the shot with the aid of 200 ml additional water and transferred to a 1 liter flask fitted with a stirrer and heating mantle. The contents are heated to 90° C. for a period of 2½ hours during which time the pentanol is expelled. The slurry is filtered, washed and dried (90° C.).

The coloristic properties of the pigments are determined by rubout, conducted according to the ASTM-method D-387-60. More specifically, tinctorial qualities are determined utilizing rubouts in lithographic varnish prepared with a Hoover Muller. The apparatus is equipped with a ½ HP 110–220V, 60 cycle motor and two glass plates. The Muller can be adjusted to stop after 25, 50, 75, or 100 revolutions with 50 revolutions being considered normal. Three weights are used which apply 150 pounds pressure between the plates. In each case, 0.6 grams of dry pigment and 1.2 grams of a lithographic varnish drier are mixed with a spatula on the lower glass plate. The upper plate is locked to the lower plate and the motor is set to stop after fifty revolutions. The plates are separated and the pigment in ink dispersion is picked up and spread out again on the lower plate and the operation repeated six more times. The resulting pigment is an ink dispersion, referred to as the masstone ink and is drawn down versus an appropriate control prepared in the identical manner. In order to assess color strengths of the samples, calculated amounts of the masstone ink (0.18 grams) and a zinc oxide paste dispersion (10 grams) are weighed accurately and mixed with a spatula on a polished glass plate. The resulting extensions, referred to as tints, are drawn down versus an appropriate control prepared in an identical manner.

Evaluation of the dried pigment of this example vs. alcohol milled product (prepared according to U.S. Pat. No. 4,857,646) via "rubout" in lithographic varnish shows it to be substantially equal in masstone color (C.I.E. ΔE<1.0).

EXAMPLE II

A 215 liter ball mill is charged with 364 kg of 0.3 cm round steel balls followed by 73 kg of water, 13.1 kg of 50% aqueous sodium hydroxide, 1.2 kg of pentanol, 454 grams of 50% aqueous BTBAC solution, and 9.1 kg of beta quinacridone crude pigment. The mill is sealed and rotated for a total of 48 hours at 35° C. with intermediate samples being removed at 24 and 36 hours.

Portions of each sample (1000 grams) are charged to two liter flasks without further dilution and heated with stirring to 80° C. with return of pentanol (condenser) to the system. After a period of 4½ hours, the flasks are opened and pentanol expunged for an additional 1½ hours at 90° C.

Isolation of the pigments so produced by filtration, washing and drying yield the following masstone C.I.E. color values vs. the alcohol milled standard (via varnish dryer mulling):

| Aqueous Milling Cycle (hrs.) | Masstone | | | |
| --- | --- | --- | --- | --- |
| | ΔL | ΔA | ΔB | ΔE |
| 24 | 0.6 | 1.0 | 1.5 | 1.9 |
| 36 | 0.9 | 1.8 | 2.0 | 2.8 |
| 48 | 1.0 | 1.6 | 1.9 | 2.7 |

The increased lightness and saturation show the potential power and range of the process in generating the desired unique magenta product.

EXAMPLE III

A two liter flask is charged with 1000 grams of the milled material of Example II. It is heated to 90° C., held at 90° C. for 7 hrs. and allowed to cool overnight. 600 ml water are added and the slurry is reheated to 90° C. (open system) so as to remove pentanol (1½ hours).

The slurry is cooled to 70° C., filtered, washed and dried. Evaluation of the product vs. the alcohol milled control gives the following color readings in an automotive, high solids enamel paint system.

| | Masstone | | | | Tint | | | |
| --- | --- | --- | --- | --- | --- | --- | --- | --- |
| | ΔL | ΔA | ΔB | ΔE | ΔL | ΔA | ΔB | ΔE |
| Example III | 1.4 | 2.0 | 3.8 | 4.5 | 0.6 | 1.2 | 3.1 | 3.3 |

An attractive, much yellower beta product than the alcohol milled product is thus obtained.

EXAMPLE IV

A sample of the aqueous milled material of Example II is transferred to a vessel fitted with a reflux condenser, heated to 80° C. and maintained at that temperature for four hours.

A 1000 gram sample is then heated for 1½ hours (open vessel) to remove pentanol. It is then filtered, washed and dried (Example IV A).

A second batch of the heated sample is transferred to a vessel where the pH is adjusted to 1.5 for acid extraction and expulsion of pentanol at 90° C. for 2 hours. The slurry is then filtered, washed and dried (Example IV B).

The C.I.E. color values relative to the alcohol milled product determined by rubout are as follows:

|           | Masstone |     |     |     | Tint |      |     |     |
|-----------|----------|-----|-----|-----|------|------|-----|-----|
|           | ΔL       | ΔA  | ΔB  | ΔE  | ΔL   | ΔA   | ΔB  | ΔE  |
| Example IV A | 0.1   | 1.4 | 2.5 | 2.8 | −0.9 | −0.4 | 0.4 | 1.0 |
| Example IV B | 0     | 0.4 | 2.4 | 2.4 | −0.1 | 0.8  | 0.8 | 1.1 |

EXAMPLE V

Aqueous milling is conducted as in Example II with the exception that 11.4 kg of millpowder from Example IA instead of 9.1 kg of crude beta quinacridone are used and the milling cycle is 16 hrs. instead of 48 hrs., using 245 kg of 1.6–2.5 mm diameter $ZrO_2$ SEPR media in place of 364 kg of 0.3 cm round steel balls.

The mill slurry is transferred to the reflux vessel, heated to 90° C. and held for four hours. The vessel is subsequently opened to the atmosphere and pentanol allowed to escape for an additional 1½ hours. The pigment is then isolated, washed and dried.

This procedure yields a pigment which is free of iron contamination (0.03% Fe) and has the following masstone color values (C.I.E.) vs. the alcohol milled counterpart by rubout.

$$\Delta L = 0.3 \quad \Delta A = 0.5 \quad \Delta B = 0.9 \quad \Delta E = 1.1$$

EXAMPLE VI

A one liter flask fitted with a reflux condenser is charged with 520 grams water, 100 grams of 50% aqueous NaOH, 6.0 grams of 50% aqueous BTBAC solution and 2.0 grams of Triton X-100 (Rohm & Haas Co.). After heating to 50° C., 67 grams of attritor milled beta quinacridone millpowder is added and the temperature is raised to 95° C. and held for 6 hours. The slurry is cooled, filtered, washed to conductivity of wash water and dried at 85° C.

The rubout comparison to the alcohol milled product reveals the following:

| Masstone |      |      |     |
|----------|------|------|-----|
| ΔL       | ΔA   | ΔB   | ΔE  |
| −0.6     | −1.3 | −0.8 | 2.7 |

The product is somewhat darker, bluer and less intense than the control but within the range of the invention.

EXAMPLE VII

A 2 liter four necked round bottom flask equipped with an agiator, a thermometer and a reflux condenser is charged with 375 ml of water, 24 grams of 50% aqueous sodium hydroxide 4.5 grams of a 50% aqueous solution of benzyltributylammonium chloride and 12 ml of n-pentanol. To this mixture is added 75 grams of the millpowder from Example IA. The whole mixture is slowly heated to reflux (97° C.) with moderate stirring and refluxing is continued for 4 hours. The contents of the flask are cooled to about 80° C. At this time, the flask is additionally equipped with a Dean-Stark water separator and a steam inlet tube. Steam is passed at such a rate that the pentanol starts distilling. The distillate is collected via the Dean-Stark apparatus where the n-pentanol is recovered by separating it from the aqueous phase. The recovered pentanol is thus available for reuse. Steam distillation is complete when all the pentanol is recovered. The resulting pigment slurry is then filtered and washed until the filtrate has a pH of 7.5–8.0. The pigment cake is dried at 80° C. until the moisture content is less than 1% to give 59.8 grams of the new modified beta quinacridone.

In comparison to the alcohol milled product, the pigment has the following masstone color values via rubout.

| ΔL    | ΔA    | ΔB   | ΔE   |
|-------|-------|------|------|
| −0.07 | −0.09 | 0.44 | 0.45 |

EXAMPLE VIIIA

A 215 liter ball mill is charged with 455 kg of "Cyl-Pebs" (chopped iron rod, 1.6 cm diameter by 1.9 cm length) and 45 kg of 100 cm nails as milling media. Thereafter, 11 kg of beta quinacridone crude and 3.6 kg of sodium sulfate (anhydrous) are added and the mill rotated at 40 RPM for 12 hours. The mill is opened and the contents discharged through a screen.

EXAMPLE VIIIB

To a 2 liter four necked round bottom flask equipped with an agitator, a thermometer and a reflux condenser are added 375 ml water, 24 grams of 50% aqueous sodium hydroxide, 4.5 grams of a 50% aqueous solution of benzyltributylammonium chloride, 12 ml of n-pentanol and 75 g of the millpowder from Example VIIIA. The whole mix is slowly heated to reflux (97° C.) with moderate stirring. Refluxing is continued for 4 hours. The contents of the flask are cooled to 70° C. and pH adjusted to 1.4–1.5 with dilute sulfuric acid. The temperature is raised to 90°±2° C. by passing steam and held for 1 hour. During this time, all the pentanol distills off. The resulting slurry is then filtered, washed with hot water to pH 7.0 and dried at 80° C. until the moisture content is less than 1% to give 59 grams of the new modified beta quinacridone with the following masstone color characteristics versus the alcohol milled goal product using rubout.

| ΔL    | ΔA    | ΔB    | ΔE   |
|-------|-------|-------|------|
| −0.11 | −0.64 | −0.01 | 0.65 |

EXAMPLE IX

Example VII is repeated except 12 ml of cyclohexanol is used instead of n-pentanol to give the following masstone results.

$$\Delta L\ 0.01 \quad \Delta A\ -0.85 \quad \Delta B\ -0.51 \quad \Delta E\ 0.99$$

EXAMPLE X

Example VII is repeated using the following amounts of ingredients.

| millpowder | 50 grams   |
| water      | 380 ml     |
| 50% NaOH   | 30.8 grams |
| BTBAC      | 4 grams    |

-continued

| | |
|---|---|
| pentanol | 10 ml | with 8 hrs. of refluxing instead of 4 hrs. The pigment thus obtained has the following masstone color values.

$\Delta L$ 0.08  $\Delta A$ 1.06  $\Delta B$ 3.77  $\Delta E$ 3.92

EXAMPLE XI

Example VII is repeated using the following ingredients

| | |
|---|---|
| millpowder | 50 grams |
| water | 380 ml |
| 50% NaOH | 37 grams |
| BTBAC | 4.5 grams |
| pentanol | 8 ml | with 3 hrs. of refluxing instead of 4 hrs. to give the following masstone results:

$\Delta L$ 0.19  $\Delta A$ 0.97  $\Delta B$ 3.49  $\Delta E$ 3.62

EXAMPLE XII

Example VII is repeated using the following ingredients

| | |
|---|---|
| millpowder | 75 grams |
| water | 633 ml |
| 50% NaOH | 28 grams |
| BTBAC | 4.5 grams |
| pentanol | 12 ml | with 2 hrs. of refluxing instead of 4 hrs. to give the following masstone result:

$\Delta L$ −0.9  $\Delta A$ −2.56  $\Delta B$ −1.44  $\Delta E$ 3.07

Summarizing, it is seen that this invention provides new process variations for the preparation of a new beta quinacridone pigment form having a range of color space values. Variations may be made in proportions, procedures and materials without departing from the scope of the invention as defined by the following claims.

What is claimed is:

1. A magenta beta crystal phase quinacridone having C.I.E. values in masstone of L=34–36, A=39–40 and B=12–15.

2. The beta quinacridone of claim 1, the particles of which have an average size in excess of about 0.1 μm.

3. A pigment composition containing the beta quinacridone of claim 1 in combination with minor amounts of a violet beta form quinacridone.

4. A process for preparing a magenta, beta-phase quinacridone pigment, which comprises
   (a) a wet milling step wherein an aqueous slurry is prepared by milling a mixture comprising 100 parts by weight of crude beta quinacridone, 600 to 1400 parts by weight of water, 6 to 15 parts by weight of a second-phase-forming alcohol, 5 to 120 parts by weight of a base and 2 to 6 parts by weight of a phase transfer catalyst;
   (b) a thermal development step wherein the milled aqueous slurry is heated to an elevated temperature for from 2 to 8 hours; and
   (c) a step wherein the magenta, beta-phase quinacridone is isolated.

5. A process of claim 4 wherein the alcohol is a $C_4$–$C_8$alkanol or a $C_5$–$C_7$cycloalkanol.

6. A process of claim 5 wherein 8 to 12 parts by weight of the alcohol are present in the mixture.

7. A process of claim 4 wherein the base is an alkali metal hydroxide or a quaternary ammonium hydroxide.

8. A process of claim 7 wherein 60 to 80 parts by weight of the base are present in the mixture.

9. A process of claim 7 wherein the base is sodium hydroxide or potassium hydroxide.

10. A process of claim 4 wherein the phase transfer catalyst is a quaternary ammonium salt.

11. A process of claim 10 wherein the phase transfer catalyst is benzyl tributyl ammonium chloride.

12. A process of claim 4 wherein the elevated temperature is from 50° C. to 100° C.

13. A process of claim 4 wherein the elevated temperature is from 70° C. to 97° C.

14. A process of claim 13 wherein the alcohol is a $C_4$–$C_8$alkanol or a $C_5$–$C_7$cycloalkanol, the base is an alkali metal hydroxide or a quaternary ammonium hydroxide and the phase transfer catalyst is a quaternary ammonium salt.

15. A process of claim 14 wherein the alcohol is pentanol.

16. A process of claim 15 wherein the magenta beta quinacridone pigment has C.I.E. values in the masstone of L=35 to 36, A=37 to 40 and B=10 to 15.

17. A process of claim 16 wherein the thermal development step is followed by an acid extraction to remove abraded grinding material.

18. A process for preparing a magenta, beta-phase quinacridone pigment, which comprises
   (a) a thermal development step wherein an aqueous mixture, which comprises 100 parts by weight of premilled beta quinacridone, 500 to 800 parts by weight of water, 12 to 25 parts by weight of a second-phase-forming alcohol, 15 to 40 parts by weight of a base and 2.5 to 5 parts by weight of a phase transfer catalyst, is heated to an elevated temperature for from 1 to 8 hours; and
   (b) a step wherein the magenta, beta-phase quinacridone is isolated.

19. A process of claim 18 wherein the alcohol is a $C_4$–$C_8$alkanol or a $C_5$–$C_7$cycloalkanol.

20. A process of claim 19 wherein 14 to 18 parts by weight of the alcohol are present in the mixture.

21. A process of claim 18 wherein the base is an alkali metal hydroxide or a quaternary ammonium hydroxide.

22. A process of claim 21 wherein 21 to 25 parts by weight of the base are present in the mixture.

23. A process of claim 21 wherein the base is sodium hydroxide or potassium hydroxide.

24. A process of claim 18 wherein the phase transfer catalyst is a quaternary ammonium salt.

25. A process of claim 24 wherein the phase transfer catalyst is benzyl tributyl ammonium chloride.

26. A process of claim 18 wherein the elevated temperature is from 70° C. to 97° C.

27. A process of claim 26 wherein the alcohol is a $C_4$–$C_8$alkanol or a $C_5$–$C_7$cycloalkanol, the base is an alkali metal hydroxide or a quaternary ammonium hydroxide and the phase transfer catalyst is a quaternary ammonium salt.

28. A process of claim 27 wherein the alcohol is pentanol.

29. A process of claim 27 wherein the magenta beta quinacridone pigment has C.I.E. values in the masstone of L=35 to 36, A=37 to 40 and B=10 to 15.

30. A process of claim 29 wherein the thermal development step is followed by an acid extraction to remove abraded grinding material.

* * * * *